United States Patent
Kitazawa et al.

(10) Patent No.: US 11,945,179 B2
(45) Date of Patent: Apr. 2, 2024

(54) METHOD AND DEVICE FOR MOLDING LAMINATE

(71) Applicant: MITSUBISHI HEAVY INDUSTRIES, LTD., Tokyo (JP)

(72) Inventors: Toshiki Kitazawa, Tokyo (JP); Homare Yamato, Tokyo (JP); Masahiko Shimizu, Tokyo (JP); Hiromichi Akiyama, Tokyo (JP); Akihiro Terasaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 217 days.

(21) Appl. No.: 17/425,640

(22) PCT Filed: Dec. 26, 2019

(86) PCT No.: PCT/JP2019/051217
§ 371 (c)(1),
(2) Date: Jul. 23, 2021

(87) PCT Pub. No.: WO2020/162077
PCT Pub. Date: Aug. 13, 2020

(65) Prior Publication Data
US 2022/0097322 A1 Mar. 31, 2022

(30) Foreign Application Priority Data
Feb. 7, 2019 (JP) .................. 2019-020754

(51) Int. Cl.
*B29C 70/28* (2006.01)
*B29C 70/30* (2006.01)
(Continued)

(52) U.S. Cl.
CPC ............ *B29C 70/541* (2013.01); *B29C 70/30* (2013.01); *B32B 5/26* (2013.01); *B32B 7/08* (2013.01);
(Continued)

(58) Field of Classification Search
CPC ..... B29C 70/541; B29C 70/30; B29C 70/543; B29C 53/04; B29C 70/345;
(Continued)

(56) References Cited

U.S. PATENT DOCUMENTS 6,354,131 B1 * 3/2002 Pirchl ................... B21D 22/22
72/351
7,141,199 B2 * 11/2006 Sana ...................... B29C 70/46
264/296

(Continued)

FOREIGN PATENT DOCUMENTS

CN 106391816 A 2/2017
DE 102007058727 A1 6/2009
(Continued)

OTHER PUBLICATIONS

PCT/ISA/210, "International Search Report for PCT International Application No. PCT/JP2019/051217," dated Mar. 17, 2020.
(Continued)

*Primary Examiner* — Jun S Yoo
(74) *Attorney, Agent, or Firm* — Manabu Kanesaka; Benjamin Hauptman; Kenneth Berner (57) ABSTRACT

The preset invention is to mold a laminate at a high accuracy by appropriately generating slippage between fiber sheets of the laminate at bending. A method for molding a laminate includes a step in which a plurality of gripping parts, which are arranged apart from each other, grip an area, wherein slippage between fiber sheets is prevented, in a plate-shaped laminate including a plurality of fiber sheets laminated each
(Continued)

other; a step in which the plurality of gripping parts grip the area wherein slippage between the fiber sheets is prevented, while maintaining the state wherein relative moving of the area of the laminate and the gripping parts is prevented; and a step in which the gripping parts move so as to subject the laminate to bending.

9 Claims, 6 Drawing Sheets (51) Int. Cl.
| | |
|---|---|
| *B29C 70/54* | (2006.01) |
| *B32B 5/26* | (2006.01) |
| *B32B 7/08* | (2019.01) |
| *B32B 37/00* | (2006.01) |
| *B32B 38/00* | (2006.01) |
| *B32B 38/18* | (2006.01) |
| B29L 31/30 | (2006.01) |
| B64C 1/00 | (2006.01) |
| B64C 1/06 | (2006.01) |

(52) U.S. Cl.
CPC ...... *B32B 37/0076* (2013.01); *B32B 38/0012* (2013.01); *B32B 38/18* (2013.01); *B29L 2031/3076* (2013.01); *B32B 2605/18* (2013.01); *B64C 2001/0072* (2013.01); *B64C 1/064* (2013.01)

(58) Field of Classification Search
CPC . B29C 70/3452; B29C 70/446; B29C 70/462; B32B 38/0012; B32B 38/18; B32B 2605/18; B29L 2031/3076; B64C 1/064; B64C 2001/0072; B64C 3/182; B29D 99/0003

See application file for complete search history.

(56) References Cited

U.S. PATENT DOCUMENTS

| | | | |
|---|---|---|---|
| 8,636,935 | B2 | 1/2014 | De Mattia |
| 9,162,396 | B2 | 10/2015 | Coxon et al. |
| 2010/0219294 | A1 | 9/2010 | Kismarton |
| 2010/0263789 | A1* | 10/2010 | Graber ................... B29C 70/56 |
| | | | 156/228 |
| 2013/0266431 | A1 | 10/2013 | Moram et al. |
| 2015/0174831 | A1* | 6/2015 | M Guez Charines ...................... |
| | | | B32B 38/0012 |
| | | | 156/196 |
| 2015/0183503 | A1* | 7/2015 | Miguez Charines ... B29C 70/34 |
| | | | 156/196 |
| 2016/0375613 | A1* | 12/2016 | Schroeder ............... B29C 53/28 |
| | | | 264/157 |

FOREIGN PATENT DOCUMENTS

| | | |
|---|---|---|
| DE | 102012019958 A1 | 4/2013 |
| JP | 2016-064646 A | 4/2016 |
| JP | 5931906 B2 | 6/2016 |
| WO | 2013/038900 A1 | 3/2013 |

OTHER PUBLICATIONS

PCT/ISA/237, "Written Opinion for PCT International Application No. PCT/JP2019/051217," dated Mar. 17, 2020.
European Patent Office, "Extended European Search Report for European Patent Application 19914393.4," dated Jan. 24, 2022.

* cited by examiner

METHOD AND DEVICE FOR MOLDING LAMINATE

RELATED APPLICATIONS

The present application is National Phase of International Application No. PCT/JP2019/051217 filed Dec. 26, 2019, and claims priority from Japanese Application No. 2019-020754, filed Feb. 7, 2019, the disclosure of which is hereby incorporated by reference herein in its entirety.

TECHNICAL FIELD

The present invention relates to a method for forming a laminate and a device for forming a laminate.

BACKGROUND ART

There is a case where aircraft structural members (for example, a stringer or the like) are formed of fiber reinforced plastic (FRP) (hereinafter referred to as a "composite material"). The composite material is manufactured as a desired structural member by flatly laminating a plurality of fiber sheets to form a laminate (charge) and forming the laminate into a target shape.

The stringer is a long part that is long in one direction, and there is a case where the cross-sectional shape thereof changes along a longitudinal direction or a twist or a contour is formed according to an application location of an aircraft. As the cross-sectional shape of the stringer, there is a hat type, an S type, or the like. The hat type has flange portions formed at both ends, a cap portion formed at the center, and a web portion connecting each of the flange portions and the cap portion. The S type has flange portions formed at both ends and a web portion that connects the two flange portions.

PTL 1 to PTL 3 below disclose methods of pushing a flat laminate into a forming tool to deform (bend) the laminate, thereby forming the laminate into a hat type or an S type.

CITATION LIST

Patent Literature

[PTL 1] U.S. Pat. No. 8,636,935
[PTL 2] U.S. Pat. No. 9,162,396
[PTL 3] Japanese Patent No. 5931906

SUMMARY OF INVENTION

Technical Problem

Figure 10:
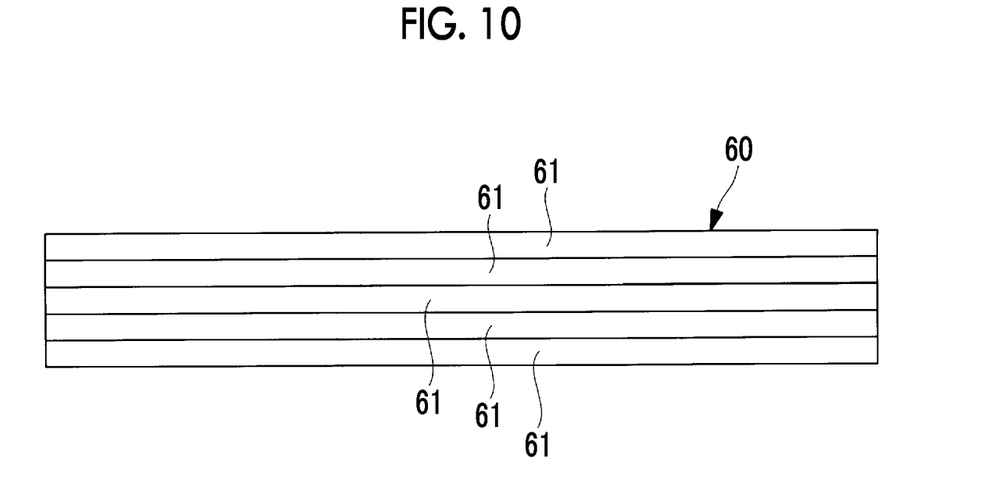
FIG. 10 is a schematic vertical sectional view showing a laminate before forming.
Figure 11:
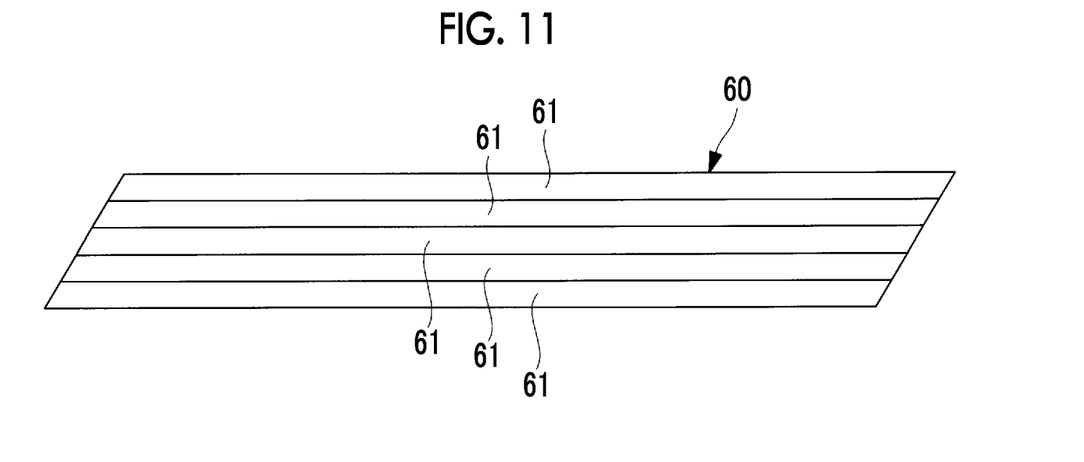
FIG. 11 is a schematic vertical sectional view showing a laminate after forming, and shows a state where a fiber sheet is appropriately moved.

In a case of manufacturing a hat-type or S-type structural member, it is necessary to bend a flat laminate 60 as shown in FIG. 10, or a gently curved laminate 60 having a large radius of curvature. At this time, in a bent area, a difference in peripheral length occurs between the inner periphery side and the outer periphery side. Therefore, it is necessary to cause slippage to appropriately occur between a fiber sheet on the inner periphery side and a fiber sheet on the outer periphery side. When the movement of each fiber sheet 61 is uniform, as shown in FIG. 11, the laminate can be deformed in a shape in which the space between the fiber sheets 61 is kept constant.

Figure 12:
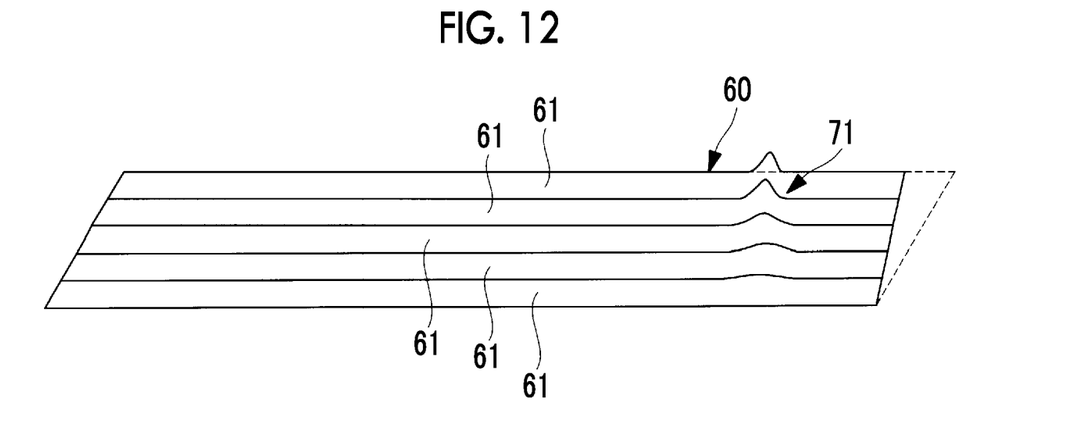
FIG. 12 is a schematic vertical sectional view showing a laminate after forming, and shows a state where wrinkles are formed in the fiber sheets.
Figure 13:
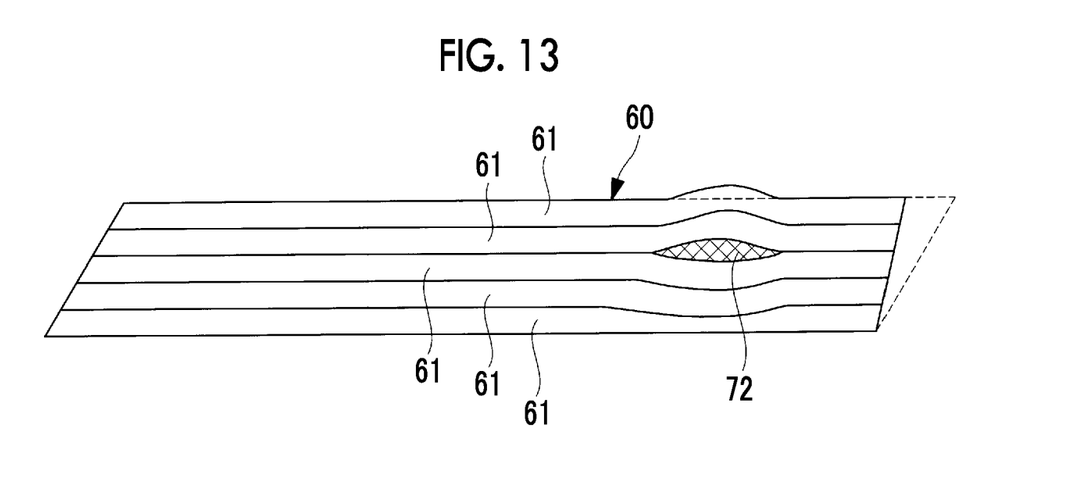
FIG. 13 is a schematic vertical sectional view showing a laminate after forming, and shows a state where a void is formed between the fiber sheets.

In a case where the fiber sheet does not appropriately slip between the fiber sheets (between layers) due to a frictional force, that is, in a case where each fiber sheet does not move at an appropriate distance in an appropriate direction, the fiber sheet is left over in an intermediate portion. As a result, as shown in FIGS. 12 and 13, due to an excess fiber sheet 61 generated in the intermediate portion, there is a possibility that a wrinkle 71 (FIG. 12) or a void 72 (FIG. 13) may be generated or that the shape of an end portion may be deformed.

In the methods described in PTL 1 to PTL 3, the end portion (flange portion) of the laminate is sandwiched by a pressing mechanism such as a bladder in a forming tool. Then, in view of the plastic deformation performance of the laminate, the end portion of the laminate is allowed to move to the center (cap portion) side together with the deformation of the laminate in a state of being sandwiched by the pressing mechanism.

Therefore, in the related art, even in the portion sandwiched by the pressing mechanism, slippage occurs between the fiber sheets at the end portion of the laminate, and therefore, there is a possibility that the movement of each fiber sheet may become uneven due to a frictional force, a wrinkle or a void may occur due to an excess fiber sheet, or the shape of the end portion may be deformed.

In the methods described in PTL 1 to PTL 3, slippage of the laminate occurs even between the pressing mechanism and the laminate, and the position of an end portion of the laminate is shifted. Therefore, there is a possibility that it may not be possible to accurately control the position of the end portion after forming so as to be the same every time. For example, in a case of manufacturing a hat-type structural member, there arises a problem in which the length of the flange portion on one side becomes longer than the length of the flange portion on the other side.

The present invention has been made in view of such circumstances and has an object to provide a method for forming a laminate and a device for forming a laminate in which it is possible to accurately form a laminate by appropriately generating slippage between fiber sheets of the laminate at the time of bending.

Solution to Problem

In order to solve the above problems, a method for forming a laminate and a device for forming a laminate according to the present invention adopt the following means.

That is, according to an aspect of the present invention, there is provided a method for forming a laminate including: a step of clamping, in a plate-shaped laminate in which a plurality of fiber sheets are laminated, an area where slippage between the fiber sheets is suppressed, by each of a plurality of clamp portions disposed to be separated from each other; a step of clamping the area of the laminate by each of the plurality of clamp portions while maintaining a state where relative movement between the area of the laminate and the clamp portion is suppressed; and a step of moving the clamp portions such that bending is performed on the laminate.

According to this configuration, the plurality of clamp portions disposed to be separated from each other clamp the laminate, and the clamp portions move, whereby bending is performed on the laminate. In the plate-shaped laminate in which a plurality of fiber sheets are laminated, an area where the slippage between the fiber sheets is suppressed is formed, and in the other area, the slippage between the fiber sheets is allowed. Therefore, when the laminate is deformed, the slippage between the fiber sheets occurs in the area where the slippage between the fiber sheets is not suppressed.

In an area on one side with a bent portion as a boundary, the slippage between the fiber sheets is suppressed, and in an area on the other side, the slippage between the fiber sheets occurs. When the clamp portion moves such that bending is performed on the laminate, the slippage between the fiber sheets occurs only in the area on the other side with the bent portion where the slippage between the fiber sheets is not suppressed as a boundary. As a result, the movement of each fiber sheet is unlikely to be uneven, an excess fiber sheet is not generated, and thus wrinkles or voids are not generated or the shape of an end portion is not deformed.

The clamp portion moves while a state where the relative movement between the area where the slippage between the fiber sheets is suppressed and the clamp portion is suppressed is maintained. Therefore, it is easy to perform control such that the position of the area where the slippage between the fiber sheets after forming is suppressed is the same every time. As a result, a desired shape can be formed with high accuracy.

In the above invention, the clamp portion may be provided with a material having a high coefficient of friction on a surface that comes into contact with the laminate.

In the above invention, the clamp portion may be provided with a plurality of micropores on a surface that comes into contact with the laminate, and suck air between the clamp portion and the laminate through the micropores.

According to these configurations, slippage is less likely to occur between the clamp portion and the laminate.

In the above invention, the clamp portion may move in a state where a tensile force continues to act in an in-plane direction in the fiber sheet of the laminate.

According to this configuration, by preventing a compressive force from acting in the in-plane direction of the fiber sheet at the time of the bending, the slippage between the fiber sheets is appropriately generated in the area where the slippage between the fiber sheets is not suppressed.

In the above invention, the clamp portion may apply an appropriate pressing force to the laminate such that an area where slippage between the fiber sheets is suppressed is formed.

In the above invention, a pin penetrating the plurality of fiber sheets in a thickness direction may be installed in the laminate such that an area where slippage between the fiber sheets is suppressed is formed.

In the above invention, a material that increases a frictional force may be installed between the fiber sheets such that an area where slippage between the fiber sheets is suppressed is formed.

In the above invention, when the fiber sheets are laminated, the laminate may be formed with a compaction force (compressive force) further increased than in other areas such that an area where slippage between the fiber sheets is suppressed is formed.

In the above invention, magnets or electromagnets may be disposed on both surfaces of the laminate to clamp the laminate by the magnets or the electromagnets such that an area where slippage between the fiber sheets is suppressed is formed.

According to these configurations, the movement of the fiber sheets is suppressed, so that the slippage between the fiber sheets is reliably suppressed.

According to another aspect of the present invention, there is provided a device for forming a laminate including: a plurality of clamp portions that are disposed to be separated from each other, and each clamp, in a plate-shaped laminate in which a plurality of fiber sheets are laminated, an area where slippage between the fiber sheets is suppressed, and clamp the laminate while maintaining a state where relative movement between the area of the laminate and the clamp portion is suppressed; a drive unit that moves the clamp portions; and a drive control unit that controls the drive unit such that bending is performed on the laminate by moving the clamp portions.

Advantageous Effects of Invention

According to the present invention, it is possible to accurately form a laminate by appropriately generating slippage between fiber sheets of the laminate at the time of bending.

DESCRIPTION OF EMBODIMENTS

Hereinafter, an embodiment according to the present invention will be described with reference to the drawings.

A fiber reinforced plastic formed product is formed of a fiber reinforced plastic (FRP) that is composed of a fiber base material and a resin. The fiber reinforced plastic formed product is an FRP structure constituting an aircraft, an FRP formed product constituting various other devices or structures, or the like. A stringer, which is one of the FRP structures, is an elongated member that is long in one direction, and the dimension thereof in a longitudinal direction is longer than the dimension in a width direction that intersects the longitudinal direction. The cross section of the stringer is, for example, a hat type or an S type.

A hat-type stringer has flange portions formed at both ends, a cap portion formed at the center, and a web portion connecting each of the flange portions and the cap portion. An S-type stringer has flange portions formed at both ends and a web portion connecting the two flange portions.

The fiber sheet is a sheet-like member. Any fiber such as carbon fiber or glass fiber is used for the fiber base material. The fiber sheets are laminated by a required number of sheets according to the thickness of the stringer, and a laminate is configured by laminating a plurality of fiber sheets. In the present embodiment, the fiber sheet is a prepreg in which a fiber base material is impregnated with a resin. However, there is no limitation thereto, and a dry sheet that can be shaped may be adopted.

The laminate before bending may have a flat shape or may have a gently curved surface shape having a large radius of curvature.

After the laminate is formed (shaped) into a target shape by using a forming device 1 according to the present embodiment, the resin is cured by heating and/or pressurization using an autoclave or the like, so that a fiber reinforced plastic formed product is formed.

Next, the forming device 1 according to the present embodiment, which forms (shapes) a laminate into a target shape will be described.

Figure 1:
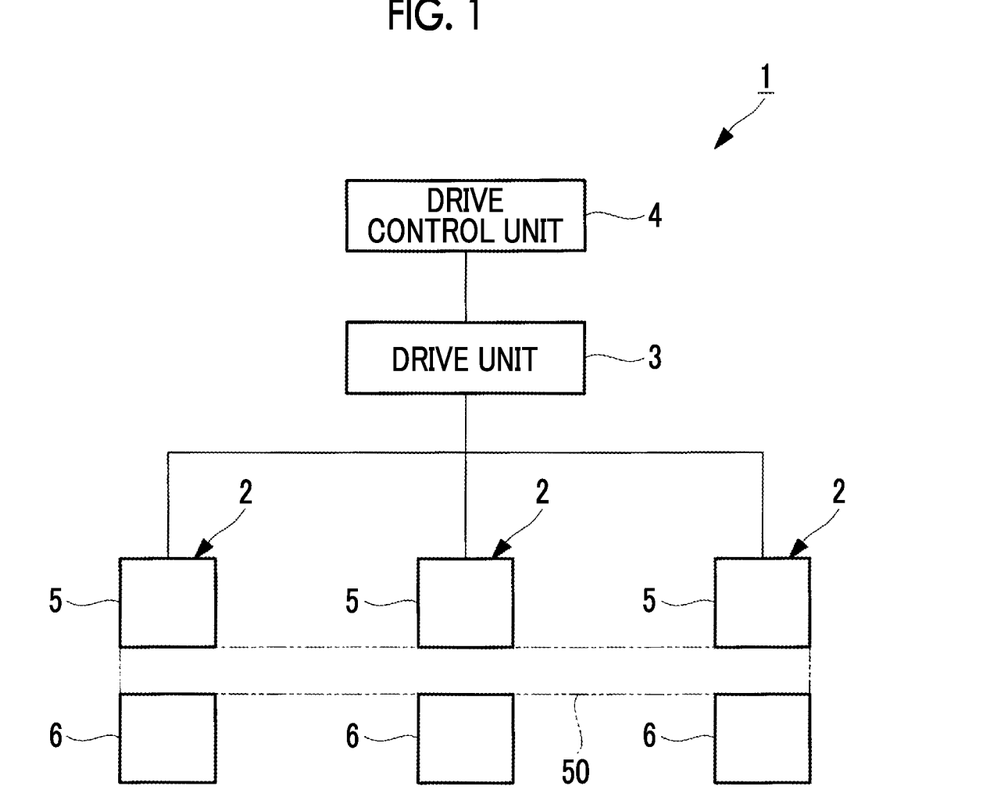
FIG. 1 is a configuration diagram showing a forming device according to an embodiment of the present invention.

As shown in FIG. 1, the forming device 1 includes a clamp portion 2, a drive unit 3, a drive control unit 4, and the like, and performs bending on a laminate 50. By the bending, the laminate 50 having a bent portion in the cross-sectional shape is formed. The bent laminate 50 is formed as a fiber reinforced plastic formed product having a cross-sectional shape such as a hat type or an S type via a curing step or the like.

The clamp portion 2 has a first presser 5 and a second presser 6 that are parallel to each other and are respectively disposed on one surface side and the other surface side of the laminate 50.

The first presser 5 and the second presser 6 can apply a pressing force to the laminate 50 interposed therebetween by moving in a direction approaching each other. On the contrary, the first presser 5 and the second presser 6 move in a direction away from each other, whereby it is possible to install the laminate 50 between the first presser 5 and the second presser 6 or reduce the pressing force applied to the interposed laminate 50.

Each of the first presser 5 and the second presser 6 has a pressing surface. The pressing surface has, for example, a quadrangular surface and comes into contact with the interposed laminate 50. The first presser 5 and the second presser 6 may have corner portions 5A and 6A at the end sides of the pressing surfaces. When the bending is performed in a state where the clamp portion 2 clamps the laminate 50, the laminate 50 is bent starting from the corner portions 5A and 6A. The cross-sectional shapes of the corner portions 5A and 6A may match the shapes corresponding to the target shapes (for example, arc shapes) of the bent portions of the laminate 50 to be formed. In this case, each of the first presser 5 and the second presser 6 of the clamp portion 2 exerts a function as a forming tool.

The pressing surface of each of the first presser 5 and the second presser 6 is provided with a configuration of preventing slippage with respect to the laminate 50. For example, a material having a high coefficient of friction (for example, rubber, a composite material, or the like) is installed on the pressing surface. A large number of micropores may be provided on the pressing surface, and air between the pressing surface and the laminate 50 may be sucked through the micropores to attract the laminate 50. At this time, the first presser 5 and the second presser 6 are in a state of applying a compressive force to the laminate 50. In this way, slippage is less likely to occur between the clamp portion 2 and the laminate 50.

The clamp portion 2 is configured to be movable by the drive unit 3 in a state where it clamps the laminate 50. In this way, the clamp portion 2 can change the installation position together with the interposed laminate 50.

The drive unit 3 is connected to the clamp portion 2 and moves the clamp portion 2. General techniques can be applied to the configuration of the drive unit 3, and detailed description thereof will be omitted in the present specification.

The drive control unit 4 controls the drive unit 3 such that the bending is performed on the laminate 50 by the movement of the clamp portion 2. For example, the drive control unit 4 controls the drive unit 3 such that the clamp portion 2 moves based on a path determined in advance. The movement path of the clamp portion 2 is calculated and determined in advance according to the target shape of the laminate 50 to be formed. The operation of the drive control unit 4 is realized by executing a program recorded in advance by using hardware resources such as a CPU.

In a case where the laminate 50 to be formed is a hat type, the distance between the plurality of clamp portions 2 corresponds to the length of the area of the laminate 50, which is to become a web portion. In a case where the clamp portion 2 clamps the area of the laminate 50, which is to become a cap portion, the width of the pressing surface of each of the first presser 5 and the second presser 6 corresponds to the length of the cap portion. In a case where the clamp portion 2 clamps the area of the laminate 50, which is to become a flange portion, the width of the pressing surface of each of the first presser 5 and the second presser 6 may be equal to or different from the length of the flange portion.

Figure 2:
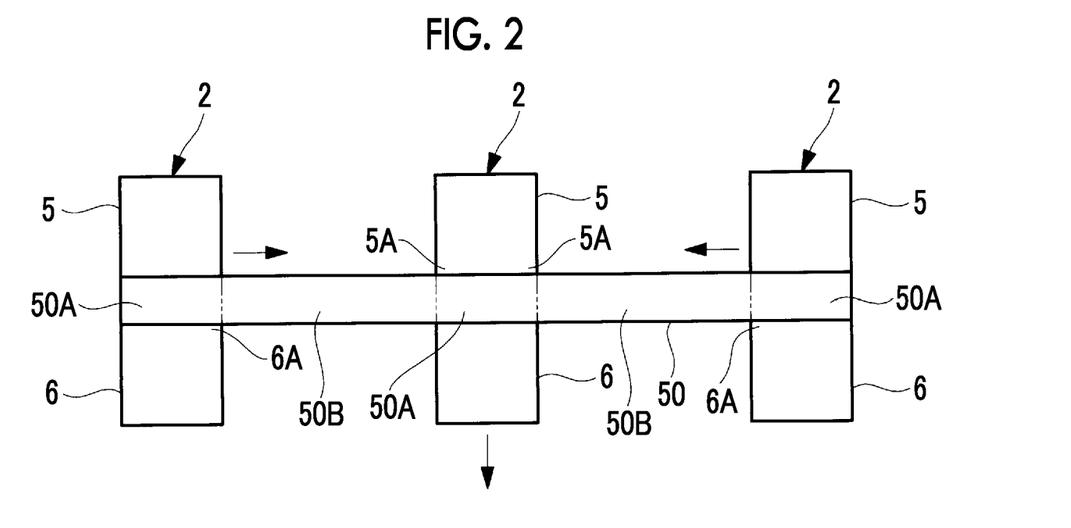
FIG. 2 is a schematic configuration diagram showing a clamp portion of the forming device according to the embodiment of the present invention, and shows a step of forming a hat-type laminate.
Figure 3:
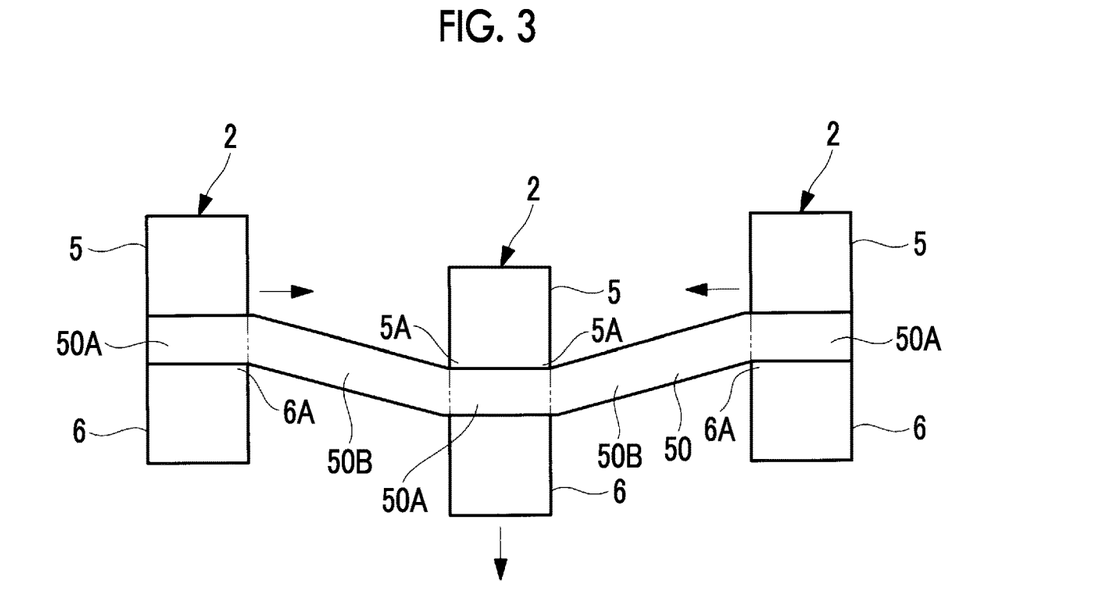
FIG. 3 is a schematic configuration diagram showing the clamp portion of the forming device according to the embodiment of the present invention, and shows a step of forming the hat-type laminate.
Figure 4:
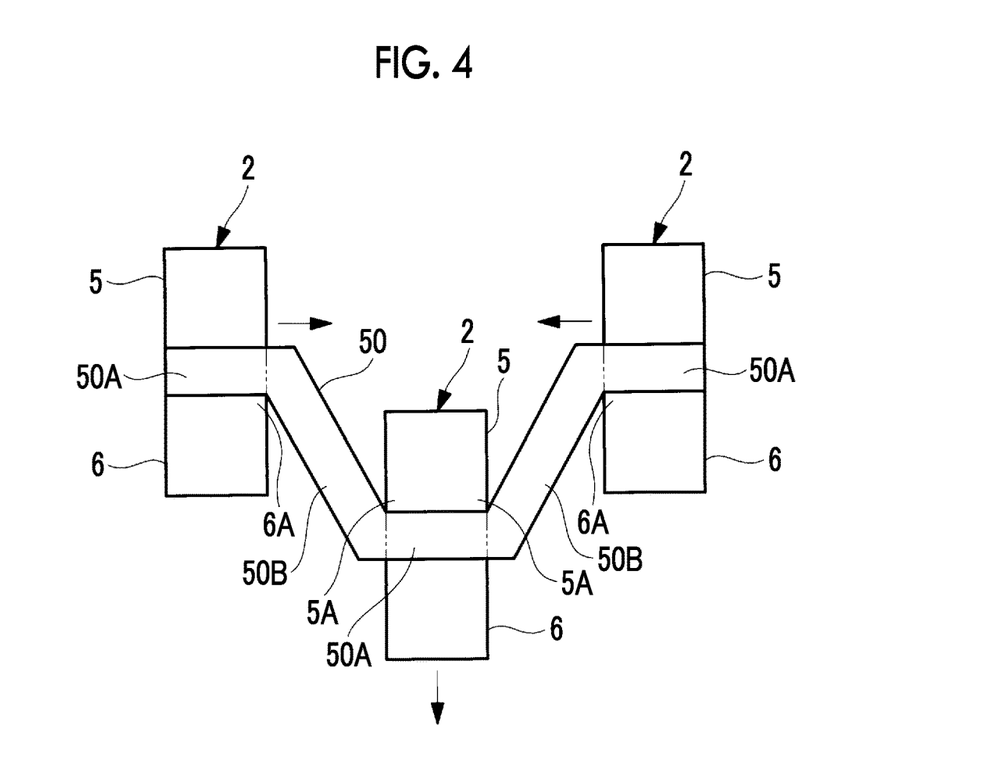
FIG. 4 is a schematic configuration diagram showing the clamp portion of the forming device according to the embodiment of the present invention, and shows a step of forming the hat-type laminate.
Figure 5:
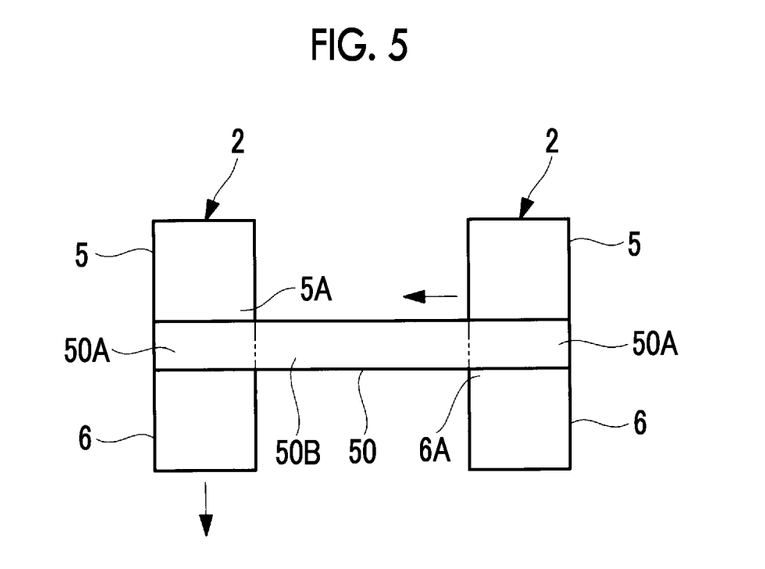
FIG. 5 is a schematic configuration diagram showing the clamp portion of the forming device according to the embodiment of the present invention, and shows a step of forming an S-type laminate.
Figure 6:
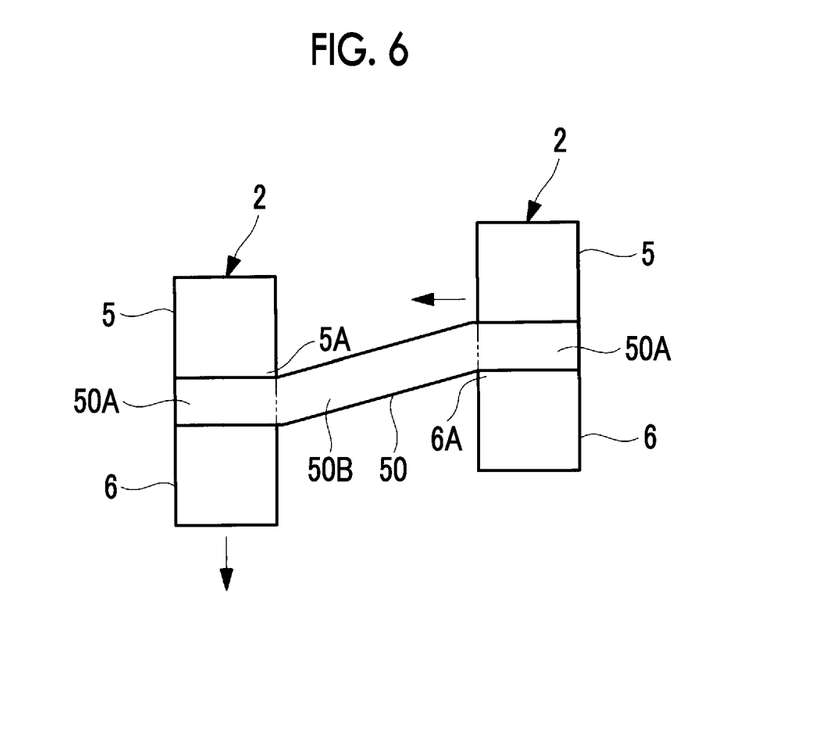
FIG. 6 is a schematic configuration diagram showing the clamp portion of the forming device according to the embodiment of the present invention, and shows a step of forming the S-type laminate.
Figure 7:
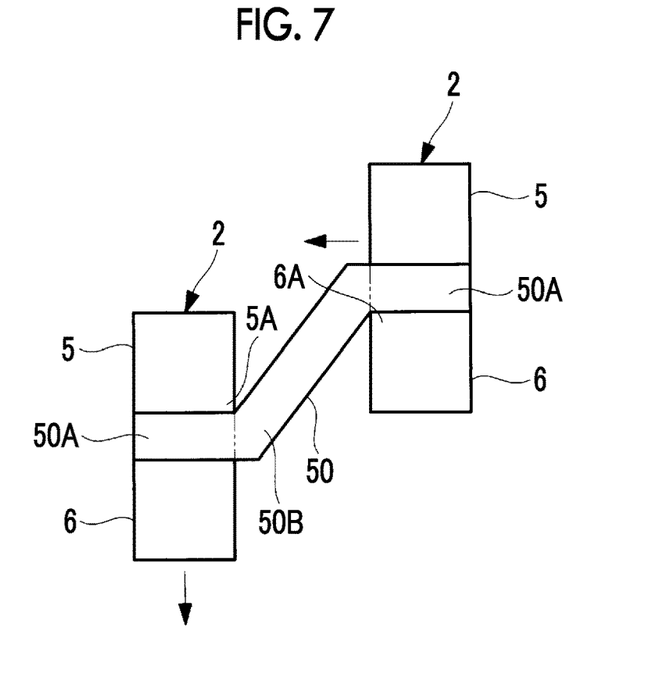
FIG. 7 is a schematic configuration diagram showing the clamp portion of the forming device according to the embodiment of the present invention, and shows a step of forming the S-type laminate.
Figure 8:
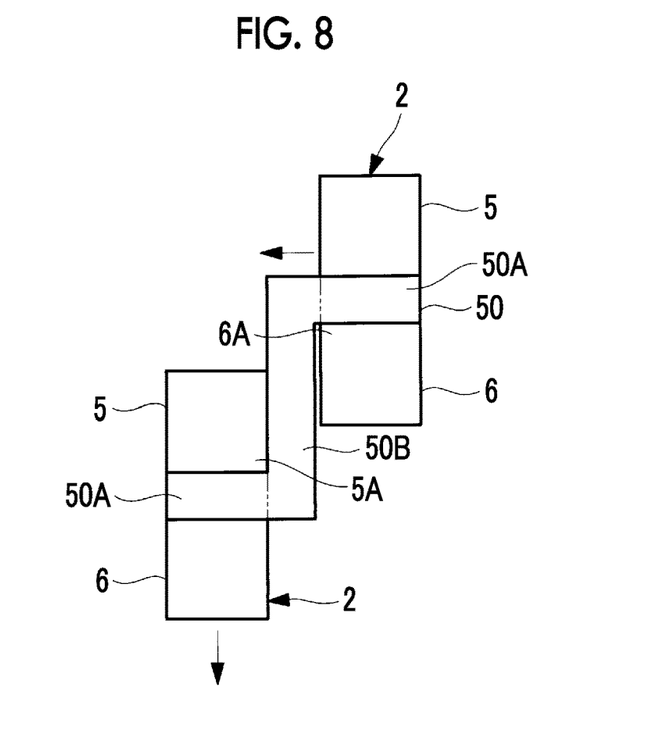
FIG. 8 is a schematic configuration diagram showing the clamp portion of the forming device according to the embodiment of the present invention, and shows a step of forming the S-type laminate.

In a case of forming a hat-type laminate 50, as shown in FIGS. 2 to 4, three clamp portions 2 are used. The clamp portion 2 that is installed at the center clamps the area of the laminate 50, which is to become a cap portion. Each of the clamp portions 2 is disposed to be separated from each other. The clamp portions 2 respectively installed at both ends clamp the areas of the laminate 50, which are to become the flange portions. When the bending is performed, the clamp portion 2 installed at the center moves in the thickness direction of the laminate 50, and the clamp portion 2 installed at the end portion moves toward the center side in the direction (in the case of the flat plate-shaped laminate 50, the direction parallel to the in-plane direction of the laminate 50) intersecting the thickness direction of the laminate 50.

In a case of forming an S-type laminate 50, as shown in FIGS. 5 to 8, two clamp portions 2 are used. Each of the clamp portions 2 clamps the area of the laminate 50, which is to become a flange portion. Each of the clamp portions 2 is disposed to be separated from each other. When the bending is performed, the clamp portion 2 installed on one end side moves in the thickness direction of the laminate 50, and the clamp portion 2 installed on the other end side moves toward the clamp portion 2 installed on one end side in the direction (in the case of the flat plate-shaped laminate 50, the direction parallel to the in-plane direction of the laminate 50) intersecting the thickness direction of the laminate 50.

Each of the clamp portions 2 moves at the same time in a state where in each fiber sheet of the laminate 50, a tensile force continues to act in the in-plane direction of the fiber sheet. By preventing a compressive force from acting in the in-plane direction of the fiber sheet at the time of the bending, the slippage between the fiber sheets is appropriately generated in an area 50B (refer to FIGS. 2 to 4 and FIGS. 5 to 8) where the slippage between the fiber sheets is not suppressed.

In the above description, the case where all the clamp portions 2 move at the same time has been described. However, the present invention is not limited to this example, and only the clamp portion 2 on the other side may move while the clamp portion 2 on one side is stopped. For example, in a case of forming the hat-type laminate 50, only the clamp portion 2 that clamps the area of the laminate 50, which is to become the flange portion, moves. In a case of forming the S-type laminate 50, only the clamp portion 2 that clamps the area of the laminate 50, which is to become the flange portion on one side, moves. In these cases, the clamp portion 2 on the moving side moves so as to rotate with the bent portions that are formed (the corner portions 5A and 6A of the fixed clamp portion 2) as the centers.

When the laminate 50 is clamped by the clamp portion 2, an appropriate pressing force is applied thereto, and thus at the time of the bending, the slippage between the fiber sheets is suppressed in an area 50A (refer to FIGS. 2 to 4 and FIGS. 5 to 8) clamped by the clamp portion 2. That is, in the area 50A clamped by the clamp portion 2, the occurrence of the slippage between the fiber sheets is prevented.

The clamp portion 2 performs clamping while maintaining a state where relative movement with the area 50A clamped by the clamp portion 2 is suppressed, at the time of the bending. That is, the occurrence of the slippage is prevented between the clamp portion 2 and the area 50A clamped by the clamp portion 2.

In this way, when the plurality of clamp portions 2 clamp the laminate 50 and the laminate 50 is bent by the movement of the clamp portions 2, the slippage between the fiber sheets does not occur in the area 50A clamped by the clamp portion 2, and in the area 50B other than the area 50A, the slippage between the fiber sheets is allowed. Accordingly, when the laminate 50 is bent, the slippage between the fiber sheets occurs in the area 50B where the slippage between the fiber sheets is not suppressed.

When the clamp portion 2 moves according to the target shape of the laminate 50 to be formed at the time of the bending, a state is created where in the area 50A on one side with the bent portion as a boundary, the slippage between the fiber sheets is suppressed, and in the area 50B on the other side, the slippage between the fiber sheets occurs. At this time, the slippage between the fiber sheets occurs only in the area 50B on the other side where the slippage between the fiber sheets is not suppressed. As a result, the movement of each fiber sheet is unlikely to be uneven, and thus an excess fiber sheet is not generated, and thus wrinkles or voids are not generated or the shape of an end portion is not deformed.

The clamp portion 2 moves while a state where the relative movement between the area 50A where the slippage between the fiber sheets is suppressed and the clamp portion 2 is suppressed is maintained. Therefore, it is easy to perform control such that the position of the area 50A where the slippage between the fiber sheets after forming is suppressed is the same every time. As a result, a desired shape can be formed with high accuracy.

Next, a processing method using the forming device 1 according to the present embodiment will be described.

First, the laminate 50 to be processed by bending is installed in the clamp portion 2. At this time, the laminate 50 is installed between the first presser 5 and the second presser 6, and the first presser 5 and the second presser 6 are brought close to each other to interpose the laminate 50 therebetween.

At this time, the first presser 5 and the second presser 6 of the clamp portion 2 apply an appropriate pressing force to the laminate 50 to form the area 50A where the slippage between the fiber sheets is suppressed. The area 50B that is not clamped by the first presser 5 and the second presser 6 is an area where the slippage between the fiber sheets is allowed.

Next, the bending is performed on the laminate 50 by moving the clamp portions 2. When the bending is performed, the laminate 50 is bent starting from the corner portions 5A and 6A of the first presser 5 and/or the second presser 6. At this time, the clamp portion 2 moves based on a movement path determined in advance such that the laminate 50 has a target shape.

When the laminate 50 is clamped by the clamp portion 2, an appropriate pressing force is applied thereto, and thus at the time of the bending, the slippage between the fiber sheets is suppressed in the area 50A clamped by the clamp portion 2. The clamp portion 2 performs the clamping while maintaining a state where relative movement with the area 50A clamped by the clamp portion 2 is suppressed, at the time of the bending.

Therefore, the slippage between the fiber sheets occurs only in the area 50B where the slippage between the fiber sheets is not suppressed.

Then, the bending is continued until the laminate 50 reaches the target shape, and when the laminate 50 has reached the target shape, the bending is stopped.

Hereinafter, modification examples of the present invention will be described.

In the embodiment described above, the case has been described where the first presser 5 and the second presser of the clamp portion 2 apply an appropriate pressing force to the laminate 50 to form the area 50A where the slippage between the fiber sheets is suppressed and the clamp portion 2 interposes the area 50A therein. However, the present invention is not limited to this example.

For example, a pin penetrating the plurality of fiber sheets in the thickness direction may be installed in the laminate 50. The pin is installed at the boundary between the area 50A where the slippage between the fiber sheets is suppressed and the area 50B where the slippage between the fiber sheets is not suppressed. In this way, the pin suppresses the movement of the fiber sheets, and thus the slippage between the fiber sheets is more reliably suppressed in the area 50A clamped by the clamp portion 2.

In the area 50A where the slippage between the fiber sheets is suppressed, an adhesive agent may be applied between the fiber sheets to fix the fiber sheets to each other. In this way, the adhesive agent suppresses the movement of the fiber sheets, and thus the slippage between the fiber sheets is reliably suppressed. Further, in the area 50A where the slippage between fiber sheets is suppressed, a coating agent for increasing a frictional force may be applied between the fiber sheets or a sheet material may be disposed to suppress the slippage between the fiber sheets.

When the laminate 50 is formed by laminating the fiber sheets, the laminate 50 may be formed by making a compaction force (compressive force) higher in the area 50A where the slippage between the fiber sheets is suppressed than in the other area 50B. In this way, in the area 50A to which a high compressive force is applied, the slippage between the fiber sheets is more reliably suppressed than in the other area 50B. The occurrence of the slippage between the fiber sheets may be suppressed by disposing magnets or electromagnets on both surfaces of the laminate 50 and clamping the laminate 50 by the magnets or the electromagnets.

These configurations for forming the area 50A in which the slippage between the fiber sheets is suppressed may be applied alone in the clamp portion 2, or a plurality of configurations may be applied in combination.

Figure 9:
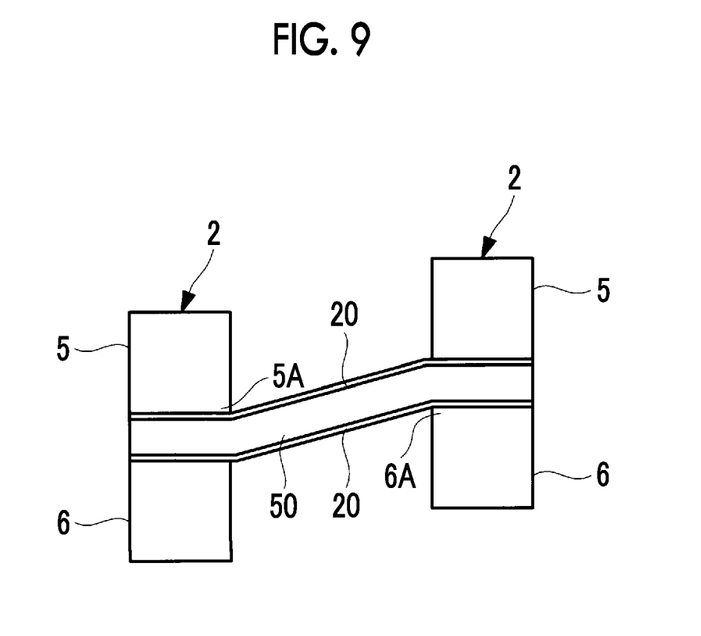
FIG. 9 is a schematic configuration diagram showing the clamp portion of the forming device according to the embodiment of the present invention, and shows a step of forming the S-type laminate by using a sheet.

As shown in FIG. 9, the bending may be performed in a state where a sheet 20 (for example, a synthetic resin sheet, a thin metal plate, or the like) having a lower elastic modulus than the laminate 50 is disposed at each of both sides of the laminate 50 to be bent. In this way, at the time of the bending, the sheet 20 can suppress the out-of-plane deformation of the fiber sheet in the area 50A where the slippage between the fiber sheets is not suppressed, and thus wrinkles and voids are less likely to occur.

REFERENCE SIGNS LIST

1: forming device
2: clamp portion
3: drive unit
4: drive control unit
5: first presser
5A, 6A: corner portion
6: second presser
20: sheet
50, 60: laminate
61: fiber sheet

The invention claimed is:

1. A method for forming a laminate comprising:
a step of clamping, in a plate-shaped laminate in which a plurality of fiber sheets are laminated, an area where slippage between the fiber sheets is suppressed, by each of a plurality of clamp portions disposed to be separated from each other, each of the clamp portions including a first presser and a second presser, the first presser and the second presser being configured to apply a pressing force to the laminate interposed therebetween by moving in a direction approaching each other; and
a step of moving at least one of the clamp portions such that bending is performed on the laminate while maintaining a state where relative movement between the area of the laminate and the clamp portion is suppressed;
wherein the bending is performed on the laminate by using only the clamp portions, the laminate being bent starting from corner portions of the first presser and/or the second presser.

2. The method for forming a laminate according to claim 1, wherein the clamp portion is provided with a material having a high coefficient of friction on a surface that comes into contact with the laminate.

3. The method for forming a laminate according to claim 1, wherein the clamp portion is provided with a plurality of micropores on a surface that comes into contact with the laminate, and sucks air between the clamp portion and the laminate through the micropores.

4. The method for forming a laminate according to claim 1, wherein the clamp portion moves in a state where a tensile force continues to act in an in-plane direction in the fiber sheet of the laminate.

5. The method for forming a laminate according to claim 1, wherein the clamp portion applies an appropriate pressing force to the laminate such that an area where slippage between the fiber sheets is suppressed is formed.

6. The method for forming a laminate according to claim 1, wherein a pin penetrating the plurality of fiber sheets in a thickness direction is installed in the laminate such that an area where slippage between the fiber sheets is suppressed is formed.

7. The method for forming a laminate according to claim 1, wherein a material that increases a frictional force is installed between the fiber sheets such that an area where slippage between the fiber sheets is suppressed is formed.

8. The method for forming a laminate according to claim 1, wherein when the fiber sheets are laminated, the laminate is formed with a compaction force further increased than in other areas such that an area where slippage between the fiber sheets is suppressed is formed.

9. The method for forming a laminate according to claim 1, wherein magnets or electromagnets are disposed on both surfaces of the laminate to clamp the laminate by the magnets or the electromagnets such that an area where slippage between the fiber sheets is suppressed is formed.

* * * * *